(12) United States Patent
Jung et al.

(10) Patent No.: US 12,210,744 B2
(45) Date of Patent: Jan. 28, 2025

(54) HYBRID MEMORY SYSTEM AND ACCELERATOR INCLUDING THE SAME

(71) Applicant: KOREA ADVANCED INSTITUTE OF SCIENCE AND TECHNOLOGY, Daejeon (KR)

(72) Inventors: Myoungsoo Jung, Daejeon (KR); Jie Zhang, Daejeon (KR); Hanyeoreum Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 136 days.

(21) Appl. No.: 18/090,645

(22) Filed: Dec. 29, 2022

(65) Prior Publication Data
US 2024/0045588 A1    Feb. 8, 2024

(30) Foreign Application Priority Data
Aug. 4, 2022   (KR) .......................... 10-2022-0097368

(51) Int. Cl.
G06F 12/00   (2006.01)
G06F 3/06    (2006.01)

(52) U.S. Cl.
CPC .......... G06F 3/0604 (2013.01); G06F 3/0647 (2013.01); G06F 3/0679 (2013.01); G06F 3/0685 (2013.01)

(58) Field of Classification Search
CPC ..... G06F 3/0647; G06F 3/0679; G06F 3/0685
See application file for complete search history.

(56) References Cited

U.S. PATENT DOCUMENTS

| | | | |
|---|---|---|---|
| 10,795,823 B2 | 10/2020 | Ramanujan et al. | |
| 2016/0224419 A1* | 8/2016 | Takai ................... | G06F 3/0679 |
| 2017/0357604 A1* | 12/2017 | Lim ..................... | G06F 13/1689 |
| 2018/0321880 A1* | 11/2018 | Jung .................... | G06F 3/0679 |
| 2020/0034046 A1* | 1/2020 | Shallal ................ | G11C 5/04 |
| 2020/0192841 A1* | 6/2020 | Lee ..................... | G06F 13/28 |
| 2021/0173567 A1* | 6/2021 | Lee ..................... | G06F 3/0685 |
| 2023/0010660 A1* | 1/2023 | Lee ..................... | G06F 12/0868 |
| 2023/0049799 A1* | 2/2023 | Sutardja .............. | G06F 3/061 |
| 2023/0134996 A1* | 5/2023 | Pax ..................... | G06F 11/1072 714/764 |

OTHER PUBLICATIONS

Jie Zhang et al., "Ohm-GPU: Integrating New Optical Network and Heterogeneous Memory into GPU Multi-Processors," Micro 21, Oct. 18-22, 2021, Virtual Event, Greece.

(Continued)

*Primary Examiner* — John A Lane
(74) *Attorney, Agent, or Firm* — LEX IP MEISTER, PLLC

(57) ABSTRACT

An accelerator includes a processor and a hybrid memory system. The hybrid memory system includes a resistance-based non-volatile memory, a DRAM used as a cache of the resistance-based non-volatile memory, a non-volatile memory controller connected to the resistance-based non-volatile memory and configured to control the DRAM and the resistance-based non-volatile memory, a memory controller configured to process a memory request from the processor and control the DRAM, and a memory channel configured to connect the DRAM, the non-volatile memory controller, and the memory controller.

20 Claims, 12 Drawing Sheets

(56) References Cited

OTHER PUBLICATIONS

Moinuddin K. Qureshi et al., "Enhancing Lifetime and Security of PCM-Based Main Memory with Start-Gap Wear Leveling," In 2009 42nd Annual IEEE/ACM international symposium on microarchitecture (Micro), IEEE, 14-23.

Hyesoon Kim et al., "MacSim: A CPU-GPU Heterogeneous Simulation Framework User Guide," Georgia Institute of Technology (2012).

Jie Zhang et al., "FlashGPU: Placing New Flash Next to GPU Cores," 2019 56th ACM/IEEE Design Automation Conference (DAC).

Seungcheol Baek et al., "A Dual-Phase Compression Mechanism for Hybrid DRAM-PCM Main Memory Architectures," GLSVLSI '12: Proceedings of the great lakes symposium on VLSI, May 2012, pp. 345-350.

\* cited by examiner

HYBRID MEMORY SYSTEM AND ACCELERATOR INCLUDING THE SAME

CROSS-REFERENCE TO RELATED APPLICATION

This application claims priority to and the benefit of Korean Patent Application No. 10-2022-0097368 filed in the Korean Intellectual Property Office on Aug. 4, 2022, the entire contents of which are incorporated herein by reference.

BACKGROUND

(a) Field

The disclosure relates to a hybrid memory system and an accelerator including the same.

(b) Description of the Related Art

Data-intensive applications such as artificial intelligence, bigdata and cloud computing require rapid analysis of more data in order to provide high-quality data-intensive application services. Accordingly, cloud and data centers are building acceleration platforms based on graphics processing units or domain-specific accelerators to meet growing computational demands. The acceleration platforms are equipped with high-bandwidth computing devices specialized for parallel computing, and require a memory system that can smoothly supply data so that the computing devices can be used with high utilization. The conventional accelerator platform utilizes a high bandwidth memory (HBM) in which dynamic random-access memories (DRAMs) having a low latency are formed to parallelize data transfer.

However, DRAM-based memory systems suffer from the low memory capacity and cannot meet the demand for high memory bandwidth of the data-centric applications. Therefore, the systems using the conventional accelerator store data in an external storage device and transfer the data from the external storage device to the inside of the accelerator whenever necessary. A process of data transfer consumes a lot of time because it includes a host's storage stack, an internal delay of the external storage device, and the data transfer through a bus. Therefore, due to the frequent data migration between the external storage device and the accelerator, application processing performance significantly decreases and power consumption increases.

SUMMARY

Some embodiments may provide a hybrid memory system and an accelerator including the same, for reducing data migration between an external storage device and an accelerator.

According to some embodiments, an accelerator including a processor and a hybrid memory system connected to the processor may be provided. The hybrid memory system may include a resistance-based non-volatile memory, a dynamic random-access memory (DRAM) used as a cache of the resistance-based non-volatile memory, a non-volatile memory controller connected to the resistance-based non-volatile memory and configured to control the DRAM and the resistance-based non-volatile memory, a memory controller configured to process a memory request from the processor and control the DRAM, and a memory channel configured to connect the DRAM, the non-volatile memory controller, and the memory controller.

In some embodiments, the non-volatile memory controller may manage first data transfer in a migration route for data migration between the DRAM and the resistance-based non-volatile memory, and the memory controller may manage second data transfer in a request route for processing the memory request.

In some embodiments, the memory controller and the non-volatile memory controller may perform the first data transfer in the migration route and the second data transfer in the request route in parallel.

In some embodiments, the non-volatile memory controller may include a non-volatile memory protocol engine configured to access the resistance-based non-volatile memory based on a protocol that the resistance-based non-volatile memory complies with, and a sequence generator configured to access the DRAM based on a protocol that the DRAM complies with.

In some embodiments, the memory controller may include a channel monitor configured to monitor a state of the memory channel and snarf data that the non-volatile memory controller writes to the DRAM.

In some embodiments, the non-volatile memory controller may include a channel monitor configured to monitor a state of the memory channel and snarf data that the memory controller reads from the DRAM.

In some embodiments, the DRAM may be used as an inclusive cache of the resistance-based non-volatile memory.

In some embodiments, the DRAM may be used as a prefetching cache of the resistance-based non-volatile memory.

In some embodiments, the hybrid memory system may be set to a mode among a plurality of modes including a first mode in which the DRAM is used as an inclusive cache of the resistance-based non-volatile memory and a second mode in which the DRAM is used as a prefetching cache of the resistance-based non-volatile memory, based on a user's selection.

According to some embodiments, a hybrid memory system mounted on an accelerator may be provided. The hybrid memory system may include a resistance-based non-volatile memory, a DRAM used as an inclusive cache of the resistance-based non-volatile memory, a memory controller configured to manage data migration for processing a memory request from a processor of the accelerator, a non-volatile memory controller configured to manage data migration between the resistance-based non-volatile memory and the DRAM, and a memory channel configured to connect the DRAM, the non-volatile memory controller, and the memory controller.

In some embodiments, the memory controller may determine whether a cache miss of the memory request indicating read occurs in the DRAM, and may determine whether first data to be evicted from the DRAM based on the cache miss is in a dirty state when the cache miss occurs. When the first data is not in the dirty state, the non-volatile memory controller may write second data of the resistance-based non-volatile memory to the DRAM, and the memory controller may respond to the memory request by snarfing the second data that the non-volatile memory controller writes to the DRAM.

In some embodiments, when the first data is in the dirty state, the memory controller may read and evict the first data from the DRAM, the non-volatile memory controller may snarf the first data evicted from the DRAM, and write second data stored in the resistance-based non-volatile memory to the DRAM, the memory controller may respond to the memory request by snarfing the second data that the non-volatile memory controller writes to the DRAM, and the non-volatile memory controller may write the first data to the resistance-based non-volatile memory.

In some embodiments, the memory controller may determine whether a cache miss of the memory request indicating write occurs in the DRAM, and may determine whether first data to be evicted from the DRAM based on the cache miss is in a dirty state when the cache miss occurs. When the first data is not in the dirty state, the memory controller may respond to the memory request by writing second data of the memory request to the DRAM and setting the second data to a dirty state.

In some embodiments, when the first data is in the dirty state, the memory controller may read and evict the first data from the DRAM, the non-volatile memory controller may snarf the first data evicted from the DRAM and write the first data to the resistance-based non-volatile memory, and the memory controller may respond to the memory request by writing second data of the memory request to the DRAM and setting the second data to a dirty state.

According to some embodiments, a hybrid memory system mounted on an accelerator may be provided. The hybrid memory system may include a resistance-based non-volatile memory, a DRAM used as a prefetching cache of the resistance-based non-volatile memory, a memory controller configured to manage data migration for processing a memory request from a processor of the accelerator, a non-volatile memory controller configured to manage data migration between the resistance-based non-volatile memory and the DRAM, and a memory channel configured to connect the DRAM, the non-volatile memory controller, and the memory controller.

In some embodiments, when the memory request corresponds to the resistance-based non-volatile memory, the memory controller may perform read or write in the resistance-based non-volatile memory in response to the memory request.

In some embodiments, when the first data of the memory request satisfies a predetermined condition, the memory controller and the non-volatile memory controller may swap first data of the resistance-based non-volatile memory and second data of the DRAM.

In some embodiments, the predetermined condition may include a condition in which the memory request belongs to a first predetermined number of addresses that are most frequently accessed in recent memory requests occurring a second predetermined number of times.

In some embodiments, the memory controller may transmit a swap command to the non-volatile memory controller, and the non-volatile memory controller may transmit swap completion to the memory controller after reading the second data from the DRAM, writing the second data to the resistance-based non-volatile memory, reading the first data from the resistance-based non-volatile memory, and writing the first data to the DRAM.

In some embodiments, the memory controller may suspend a memory request conflicting with an operation according to the swap command at a time of transmitting the swap command, and process the suspended memory request in response to the swap completion.

BRIEF DESCRIPTION OF THE DRAWINGS

FIG. 7 is a diagram for explaining an example of a vertically-integrated mode of a hybrid memory system according to an embodiment of.

DETAILED DESCRIPTION OF THE EMBODIMENTS

Figure 1:
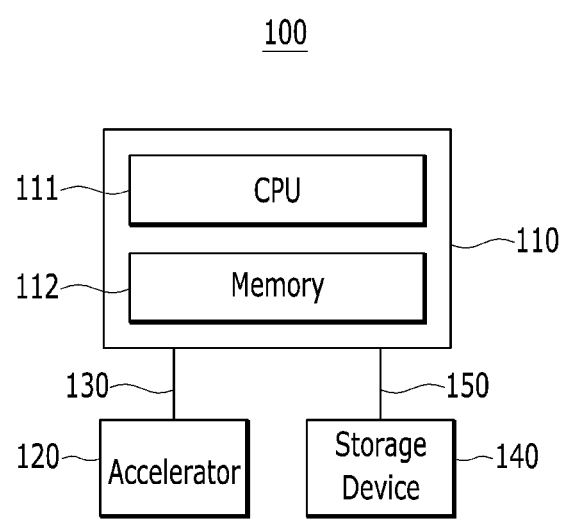
FIG. 1 is a block diagram showing an example of a computing device according to an embodiment.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a block diagram showing an example of a computing device according to an embodiment. FIG. 1 shows an example of a computing device, and the computing device may be implemented by various structures.

Referring to FIG. 1, a computing device according to an embodiment includes a central processing unit (CPU) 111, a memory 112, and an 120.

The CPU 111 executes one or more instructions to perform various operations (e.g., operations such as arithmetic, logic, controlling, and input/output (I/O) operations.). The memory 112 is a system memory (or referred to as a "main memory") that is accessed and used by the CPU 111, and may be, for example, a dynamic random-access memory (DRAM). A system including the CPU 111 and the memory 112 may be referred to as a host 110.

The accelerator 120 is a supplementary data processing device different from the CPU 111, and may be computer hardware for performing data processing by supplementing functions of the CPU 111 or performing the data processing independently of the CPU 111. Examples of the accelerator 120 include a graphic processing unit (GPU) and a many integrated core (MIC) device. The accelerator 120 is a hybrid memory-based accelerator in which a hybrid memory system is mounted. The hybrid memory system includes different types of memories, and the different types of memories may include a DRAM and a resistance-based non-volatile memory. In some embodiments, the resistance-based non-volatile memory may include a phase-change memory (PCM) (e.g., phase-change random-access memory (PRAM)), a magnetoresistive memory (e.g., spin-transfer torque magnetoresistive random-access memory (STT-MRAM)), a resistive memory (e.g., resistive random-access memory (resistive RAM or ReRAM), or a ferroelectric memory (e.g., ferroelectric random-access memory (ferroelectric RAM or FeRAM)). Hereinafter, for convenience, the non-volatile memory is described as the PCM.

In some embodiments, the accelerator 120 may be connected to the host 110 via a bus (i.e., interconnect) 130.

In some embodiments, the computing device 100 may further include a separate storage device 140. The storage device 140 may be connected to the host 110 through a bus (i.e., interconnect) 150.

Figure 2:
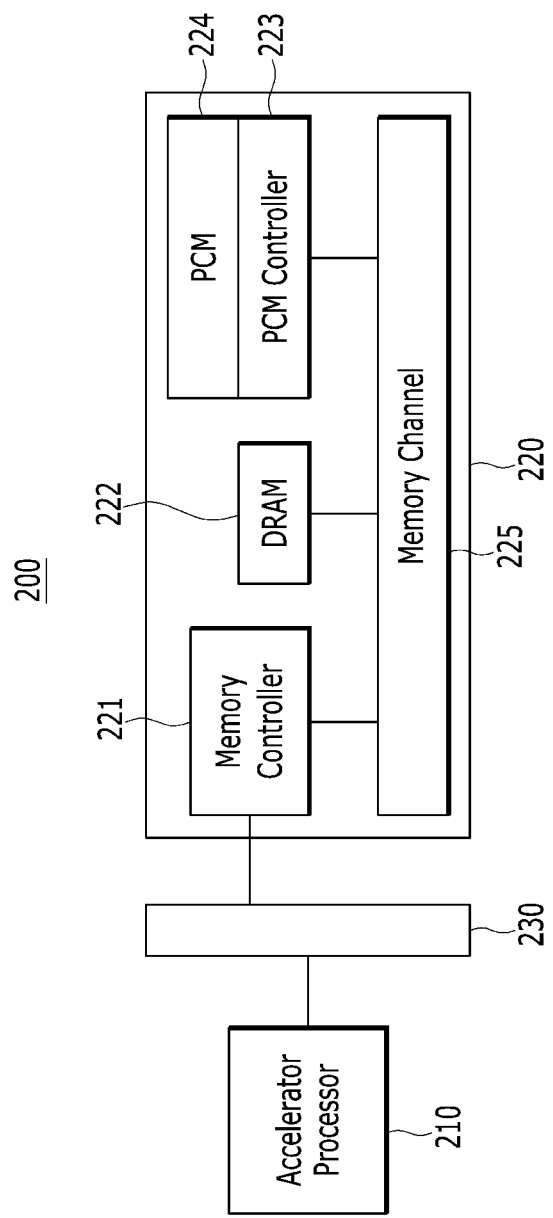
FIG. 2 is a block diagram showing an example of an accelerator according to an embodiment.
Figure 3:
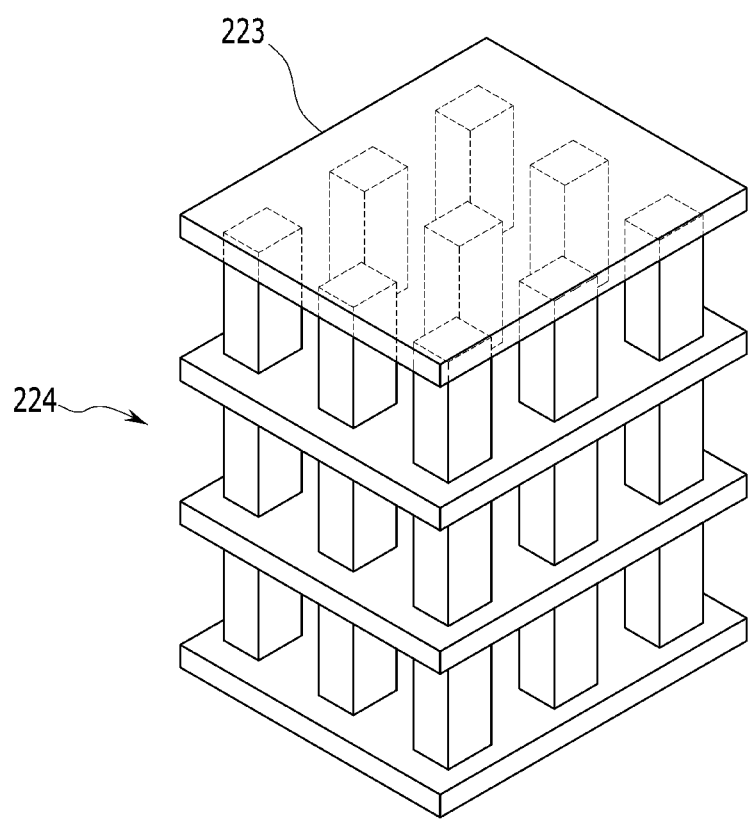
FIG. 3 is a diagram showing an example of a connection structure between a PCM and a PCM controller in an accelerator according to an embodiment.

FIG. 2 is a block diagram showing an example of an accelerator according to an embodiment, and FIG. 3 is a diagram showing an example of a connection structure between a PCM and a PCM controller in an accelerator according to an embodiment.

Referring to FIG. 2, an accelerator 200 includes an accelerator processor 210 and a hybrid memory system 220. In some embodiments, the accelerator 200 may further include a network 230 connecting the accelerator processor 210 and the hybrid memory system 220. The accelerator processor 210 corresponds to a core of the accelerator 200 and may perform data processing. In some embodiments, the accelerator processor 210 may include multiple processing cores. In some embodiments, the processing core may be a streaming multiprocessor (SM). The accelerator processor 210 may generate a memory request to access a specific address of the hybrid memory system 220 according to data processing (e.g., application execution). The accelerator processor 210 may read data from the hybrid memory system 220 or write data to the hybrid memory system 220 according to a memory request. In some embodiments, the memory request may include a request type, an address, and a length. The request type may indicate read or write, and the length may indicate a data size of a request target. The address may indicate a location to be accessed in the hybrid memory system 220. In some embodiments, the accelerator processor 210 may include multiple processing cores for parallel processing. In some embodiments, the accelerator 200 may further include a cache used by the accelerator processor 210.

The hybrid memory system 220 includes a memory controller 221, a DRAM 222, a non-volatile memory controller 223, a PCM 224, and a memory channel 225 that connects the memory controller 221, the DRAM 222, and the non-volatile memory controller 223. Hereinafter, the non-volatile memory controller 223 is described as a PCM controller". The memory controller 221 may process a memory request from the accelerator processor 210 and control the DRAM 222. In some embodiments, the memory controller 221 may manage data migration for processing the memory request. The PCM controller 223 may be connected to the PCM 224, and may control the DRAM 222 and the PCM 224. In some embodiments, the PCM controller 223 may manage data migration between the PCM 224 and the DRAM 222. In some embodiments, as shown in FIG. 3, the PCM controller 223 may be located in a logic layer on top of a storage layer in which the PCM 224 is located, and may be directly connected to the PCM 224.

The hybrid memory system 220 may increase a memory capacity by exploiting a large capacitor offered by the PCM 224, and may use the DRAM as a cache of the PCM 224 to minimize performance degradation due to long latency of the PCM 224. Accordingly, the hybrid memory system 220 can solve a frequent data migration problem caused by an insufficient capacity of the existing accelerator memory system.

In some embodiments, the hybrid memory system 220 may support two modes which use different caching schemes. A first mode is a mode in which the DRAM 222 is used as an inclusive cache of the PCM 224, and may be referred to as a "vertically-integrated mode". When the DRAM 222 is used as the inclusive cache of the PCM 224, data stored in the DRAM 222 may be also stored in the PCM 224, so the capacity of the hybrid memory system 220 may be equal to the capacity of the PCM 224. In some embodiments, the hybrid memory system 220 may optimize a space by adopting a direct-map cache scheme for implementing the inclusive cache. A second mode is a mode in which the DRAM 222 is used as a prefetching cache of the PCM 224, and may be referred to as a "horizontally-integrated mode". When the DRAM 222 is used as the prefetching cache of the PCM 224, the DRAM 222 and the PCM 224 may form independent address spaces (i.e., different data are stored in the DRAM 222 and the PCM 224), and some of the data (for example, data that are frequently accessed above a certain level) among the data in the PCM 224 may be moved to the DRAM 222. Accordingly, the capacity of the hybrid memory system 220 in the horizontally-integrated mode may be equal to a sum of the capacity of the DRAM 222 and the capacity of the PCM 224.

In some embodiments, the user may select a desired mode from among the two modes. In some embodiments, in each mode, a migration route that is a logical route for data migration between the DRAM 222 and the PCM 224 and a request route that is a logical route for processing a memory request may be set in the hybrid memory system 220. The PCM controller 223 may manage data transfer on the migration route, and the memory controller 221 may manage data transfer on the request route. Further, the hybrid memory system 200 may be designed so that operations in the two logical routes are performed in parallel. That is, the memory controller 221 and the PCM controller 223 may perform the data transfer in the migration route and the data transfer in the request route in parallel. The two logical routes that operate in parallel in this way may be referred to as "dual routes".

Figure 4:
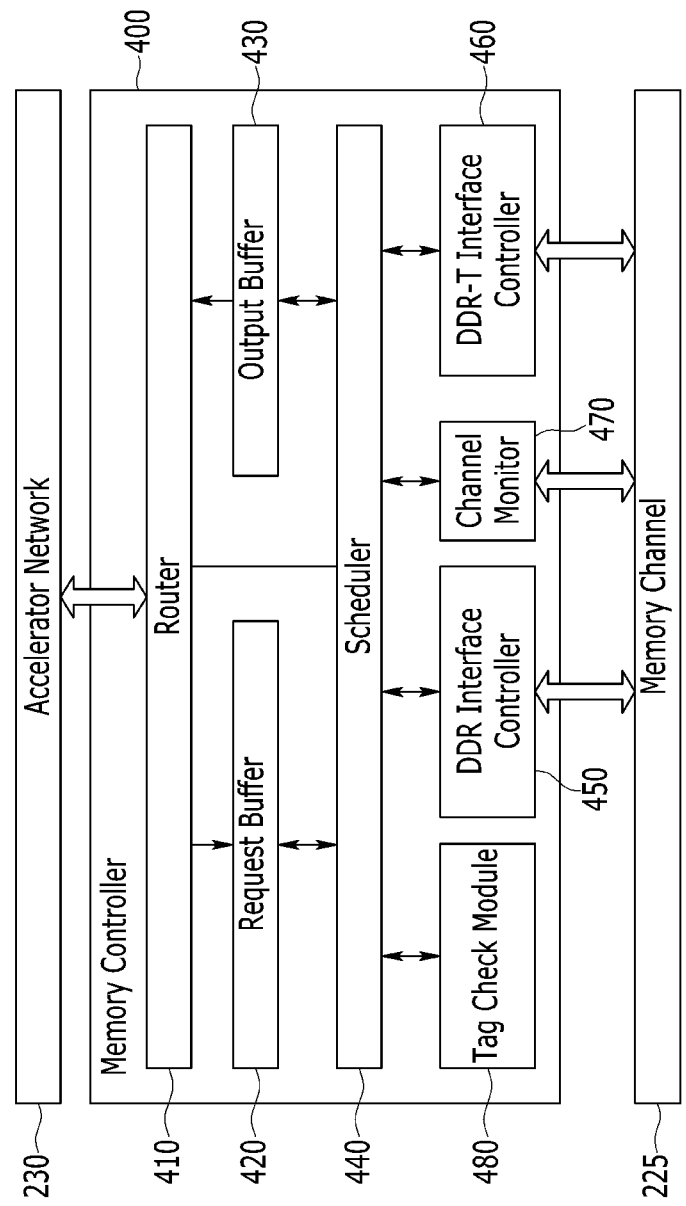
FIG. 4 is a block diagram showing an example of a memory controller in a hybrid memory system according to an embodiment.

FIG. 4 is a block diagram showing an example of a memory controller in a hybrid memory system according to an embodiment.

Referring to FIG. 4, a memory controller 400 may include a router 410, a request buffer 420, an output buffer 430, a scheduler 440, interface controllers 450 and 460, and a channel monitor 470.

The router 410 may communicate with an accelerator network 230. The router 410 may receive a memory request from an accelerator processor (e.g., 210 in FIG. 2) through the accelerator network 230 and transmit a completion message to the accelerator processor 210 through the accelerator network 230. In some embodiments, the router 410 may receive the memory request in the form of packets and transmit the completion message in the form of packets. In some embodiments, when the memory request is a memory request indicating read (referred to as a "read request"), the router 410 may transmit data, which is a target of the read request, in the form of packets together with the completion message. In some embodiments, when the memory request is a memory request indicating write (referred to as a "write request"), the router 410 may receive data, which is a target of the write request, in the form of packets together with the memory request.

The request buffer 420 may store the memory request received through the router 410. The request buffer 420 may store the data of the write request received together with the write request. The output buffer 430 may store the completion message according to the memory request. The output buffer 430 may store the data of the read request received along with the completion message according to the read request.

The scheduler 440 may manage operations of other components in the memory controller 400. The scheduler 440 may store the memory request received through the router 410 in the request buffer 420 and schedule memory requests stored in the request buffer 420. In some embodiments, the scheduler 440 may sequentially process the memory requests stored in the request buffer 420 and pass them to the interface controller 450 or 460. The scheduler 440 may store the completion message transmitted from the interface controller 450 or 460 in the output buffer 430 and output it to the accelerator network 230 through the router 410.

The interface controller 450 may be connected to the memory channel 225 and communicate with the DRAM (e.g., 222 in FIG. 2) through the memory channel 225. The interface controller 450 may write the data to the DRAM 222 or read the data from the DRAM 222 based on an interface protocol that DRAM 222 complies in response to the memory request. In some embodiments, the interface protocol that DRAM 222 complies with may be a double data rate (DDR) protocol. Hereinafter, the interface controller 450 is referred to as a "DDR interface controller".

The interface controller 460 may be connected to the memory channel 225 and communicate with a PCM controller (e.g., 223 in FIG. 2) through the memory channel 225. The interface controller 460 may perform communication with the PCM controller 223 based on an interface protocol that the PCM controller 223 complies with in response to the memory request. In some embodiments, the interface protocol that the PCM controller 223 complies with may be a DDR transactional (DDR-T) protocol. Hereinafter, the interface controller 460 is referred to as a "DDR-T interface controller".

The channel monitor 470 may be connected to the memory channel 225, and may monitor a state of the memory channel 225 to perform an operation that snarfs request information and data that are transmitted from the PCM controller 223 to the DRAM 222. "Snarf" refers to an operation in which a specific controller monitors a state of the memory channel 225 and reads data communicated between different components.

In some embodiments, the memory controller 400 may further include a tag check module 480. The tag check module 480 may be used in a vertically-integrated mode. The tag check module 480 may separate an index (or cache address) and tag from an address of the memory request, and determine whether requested data is in the DRAM 222 based on the tag. For example, the tag check module 480 may determine whether requested data is in the DRAM 222 by checking whether a tag of a cache line corresponding to the index in the DRAM 222 used as an inclusive cache is equal to as the tag of the memory request.

Figure 5:
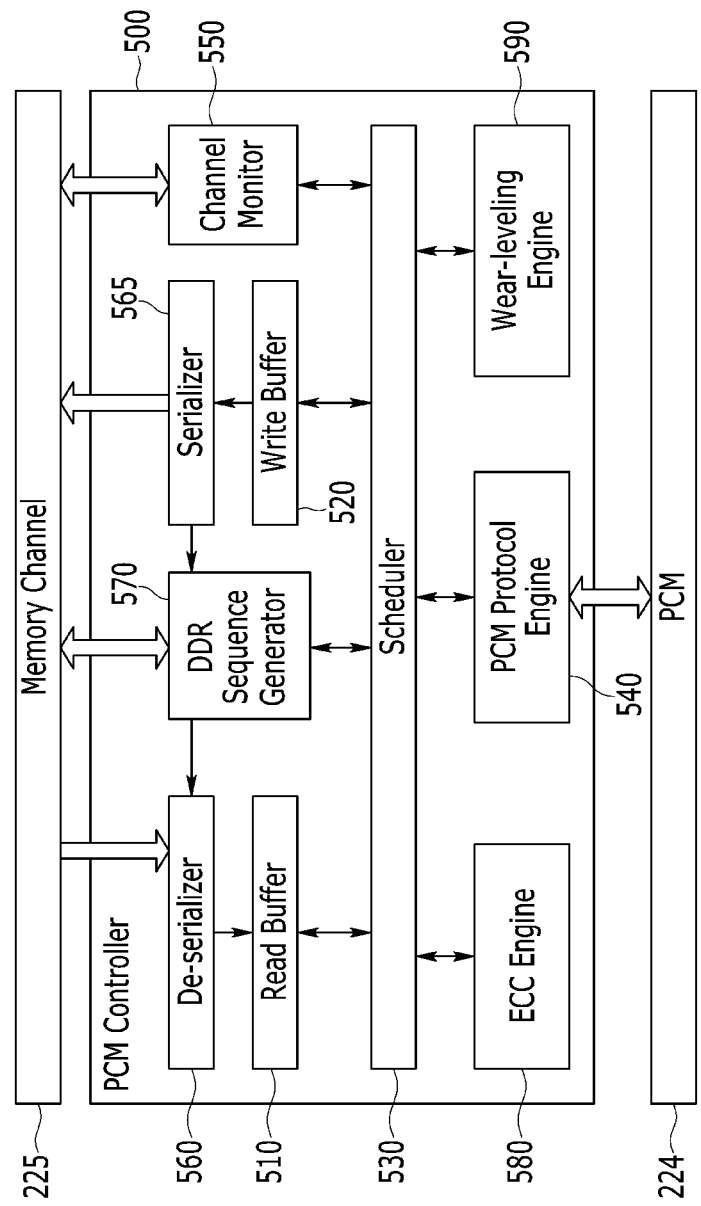
FIG. 5 is a block diagram showing an example of a PCM controller in a hybrid memory system according to an embodiment.

FIG. 5 is a block diagram showing an example of a PCM controller in a hybrid memory system according to an embodiment.

Referring to FIG. 5, a PCM controller 500 may include a read buffer 510, a write buffer 520, a scheduler 530, a PCM protocol engine 540, a channel monitor 550, and a protocol sequence generator 570.

The read buffer 510 may store a memory request received through a memory channel (e.g., 225 of FIG. 2). The read buffer 510 may store write request data received along with the write request. The PCM controller 500 may further include a de-serializer 560 that converts memory requests and/or data serially (or sequentially) received through the memory channel 225 into parallel and stores them in the read buffer 510. The write buffer 520 may store a completion message according to the memory request. The write buffer 520 may store data of a read request received along with the completion message according to the read request. In some embodiments, the PCM controller 500 may further include a serializer 565 that serializes completion messages and/or data stored in the write buffer 520 and transmits the serialized them through the memory channel 225.

The scheduler 530 may manage operations of other components in the PCM controller 500. The scheduler 530 may schedule memory requests stored in the read buffer 510. In some embodiments, the scheduler 530 may sequentially process the memory requests stored in read buffer 510. The scheduler 530 may store the completion message and/or data in the write buffer 520 after processing the memory request stored in the read buffer 510.

The PCM protocol engine 540 may access the PCM 224 (that is, perform write/read operations on the PCM 224) according to a PCM protocol that the PCM 224 complies with. The channel monitor 550 may monitor the memory channel 225 to snarf a memory request and/or data sent from the memory controller 221 to the DRAM (e.g., 222 of FIG. 2).

The protocol sequence generator 570 may perform an operation of writing data to or reading data from the DRAM 222 according to a protocol (e.g., a DDR protocol) that the DRAM 222 complies with. Hereafter, the protocol sequence generator 570 is referred to as a "DDR sequence generator". Accordingly, the PCM controller 500 may directly access the DRAM 222 through the DDR sequence generator 570.

In some embodiments, the PCM controller 550 may further include an error correction code (ECC) engine 580 and/or a wear-leveling engine 590. The ECC engine 580 may correct errors, which may occur due to characteristics of the PCM during reading, by using ECC. The ECC may be, for example, a Bose-Chaudhuri-Hocquengham (BCH) code or a low-density parity check code (LDPC) code. The wear-leveling engine 590 may prevent input/output from being concentrated on a specific physical address by using an address translation-based wear-leveling scheme. The address translation-based wear-leveling scheme may be, for example, a start-gap wear-leveling scheme.

Next, an operation in a vertically-integrated mode of a hybrid memory system according to an embodiment is described with reference to FIG. 6 to FIG. 9.

Figure 6:
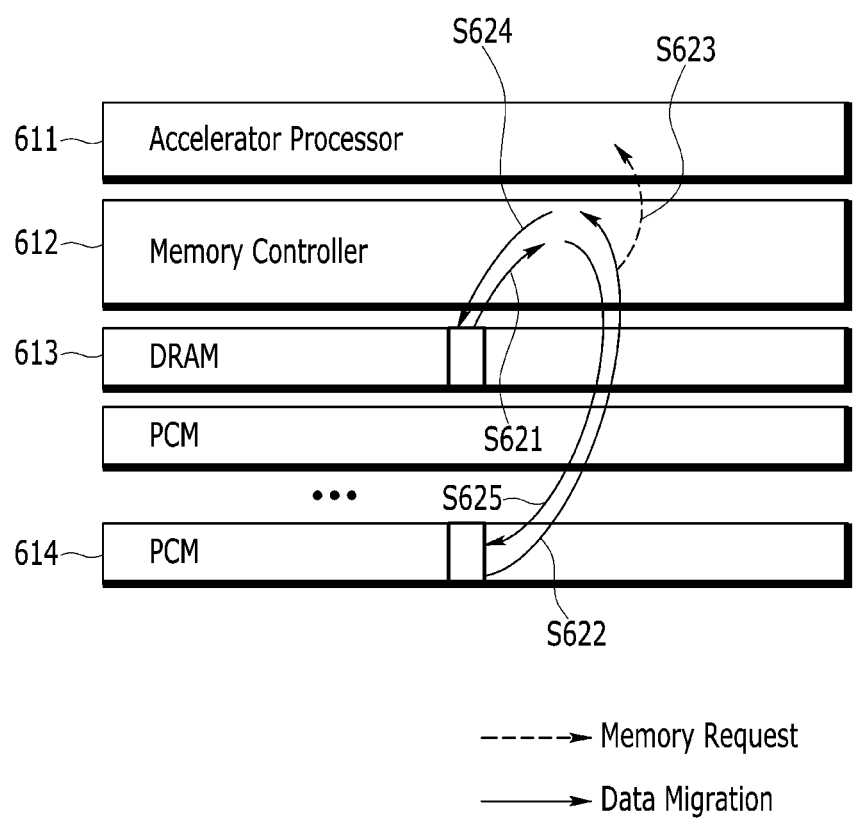
FIG. 6 is a diagram for explaining an example of a vertically-integrated mode of a hybrid memory system not using dual routes.
Figure 7:
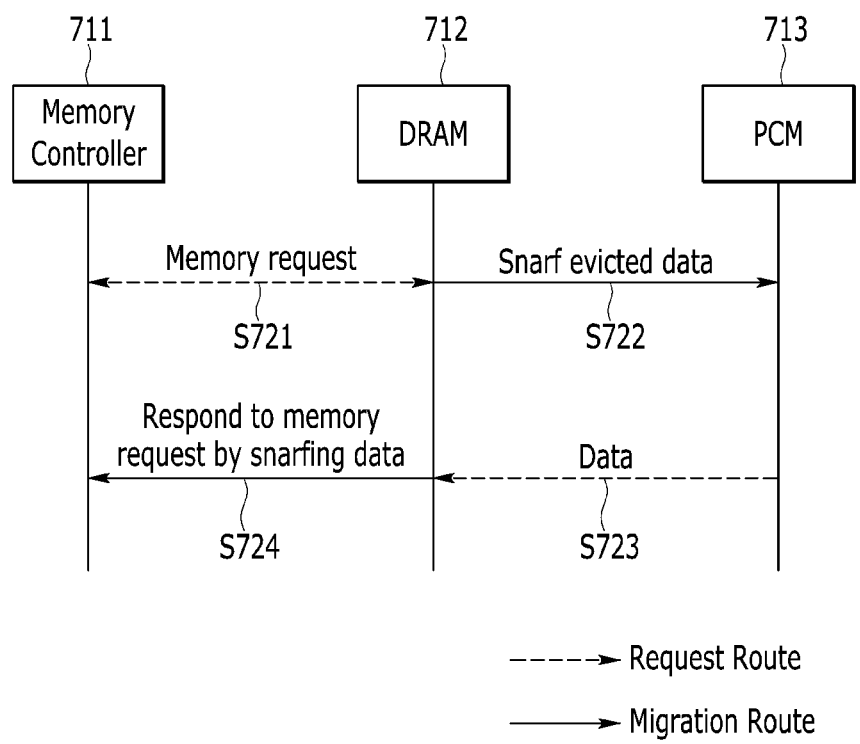

FIG. 6 is a diagram for explaining an example of a vertically-integrated mode of a hybrid memory system not using dual routes, and FIG. 7 is a diagram for explaining an example of a vertically-integrated mode of a hybrid memory system according to an embodiment of. It is assumed in FIG. 6 and FIG. 7 that a memory request is a read request and target data of the memory request does not exist in a DRAM used as an inclusive cache.

Referring to FIG. 6, when a memory request occurs in an accelerator processor 611, a memory controller 612 may check whether target data of the memory request exists in a DRAM 613 used as a cache at S621. When the target data does not exist in the DRAM 613 (i.e., when a cache miss occurs), the memory controller 612 may read data to be evicted from the DRAM 613 at S621. Since the target data does not exist in the DRAM 613, the memory controller 612 may read the target data from a PCM 614 at S622. The memory controller 612 may respond to the memory request with the target data read from the PCM 614 at S623.

Further, the memory controller 612 may store the target data in the DRAM 613, i.e., a cache line from which data is evicted in the DRAM 613 in preparation for accessing the target data again at S624. If the cache line evicted in the DRAM 613 is in a state (i.e., a dirty state) where the cache line has been modified after being stored in the DRAM 613, the memory controller 612 may writeback the cache line (i.e., the evicted cache line) in the modified state to the PCM 614 at S625.

Referring to FIG. 7, in a vertically-integrated mode using dual routes, when a memory request occurs, a memory controller 711 may determine whether target data of the memory request exists in a DRAM 712 at S721. When the target data does not exist in the DRAM 222 (i.e., when a cache miss occurs), the memory controller 711 may read data to be evicted from the DRAM 712 at S721. At the same time, a PCM controller may snarf the data which the memory controller 711 reads from the DRAM 712 and then write the snarfed data to a PCM 713 at S722.

Next, the PCM controller may read target data of the memory request existing in the PCM 713 and write the data to the DRAM 712 at S723. At the same time, the memory controller 221 may snarf the target data that the PCM controller migrates from the PCM 713 to the DRAM 712, and then respond to the memory request with the snarfed target data at S724. That is, the memory controller 711 may generate a completion message and transmit the completion message to an accelerator processor at S724.

In this way, compared to a case of not using the dual routes (the case of FIG. 6), the memory request processing can be shortened by performing data transfer in parallel through a request route and a migration route in the dual routes.

Figure 8:
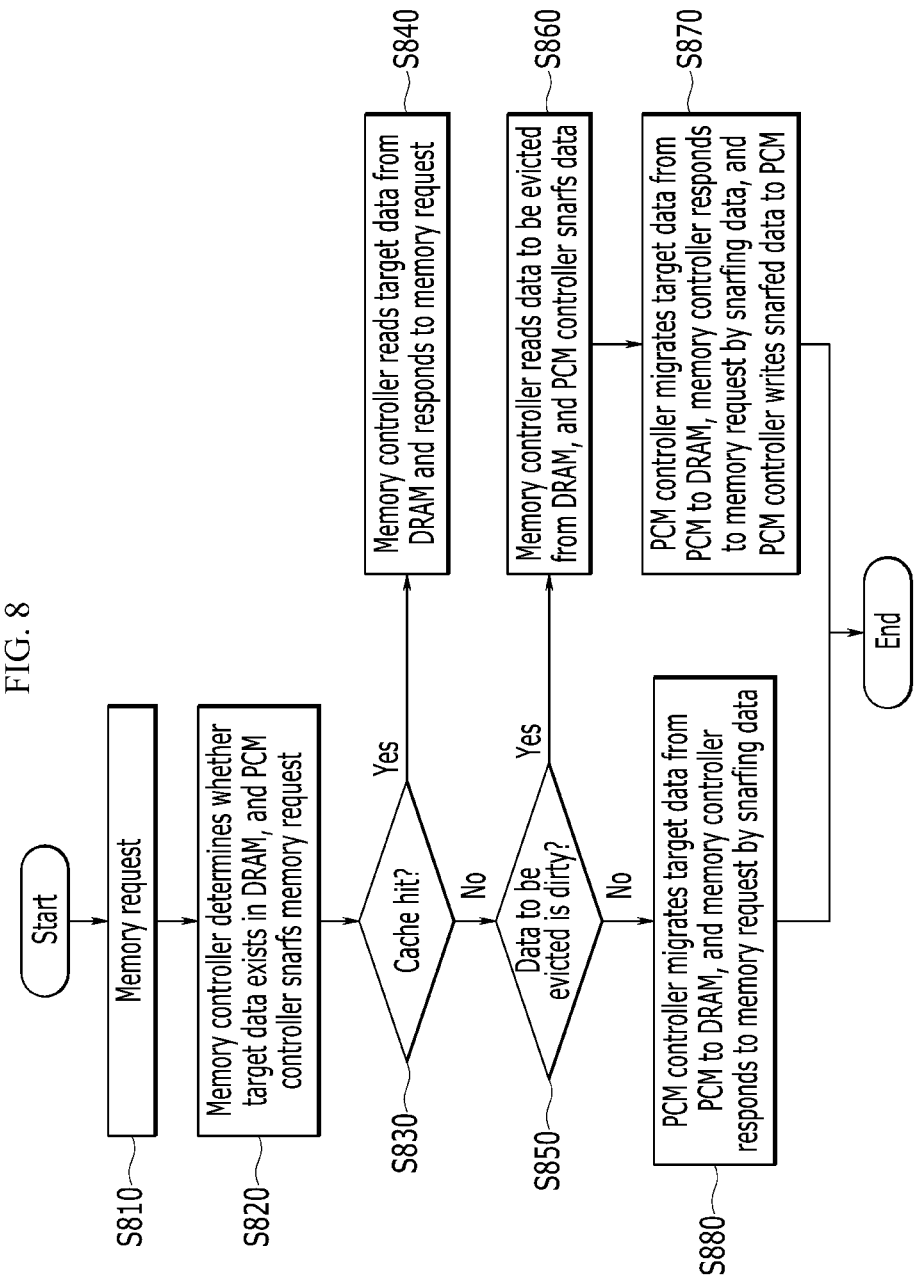
FIG. 8 is a flowchart showing an example of a read operation in a vertically-integrated mode of a hybrid memory system according to an embodiment.
Figure 9:
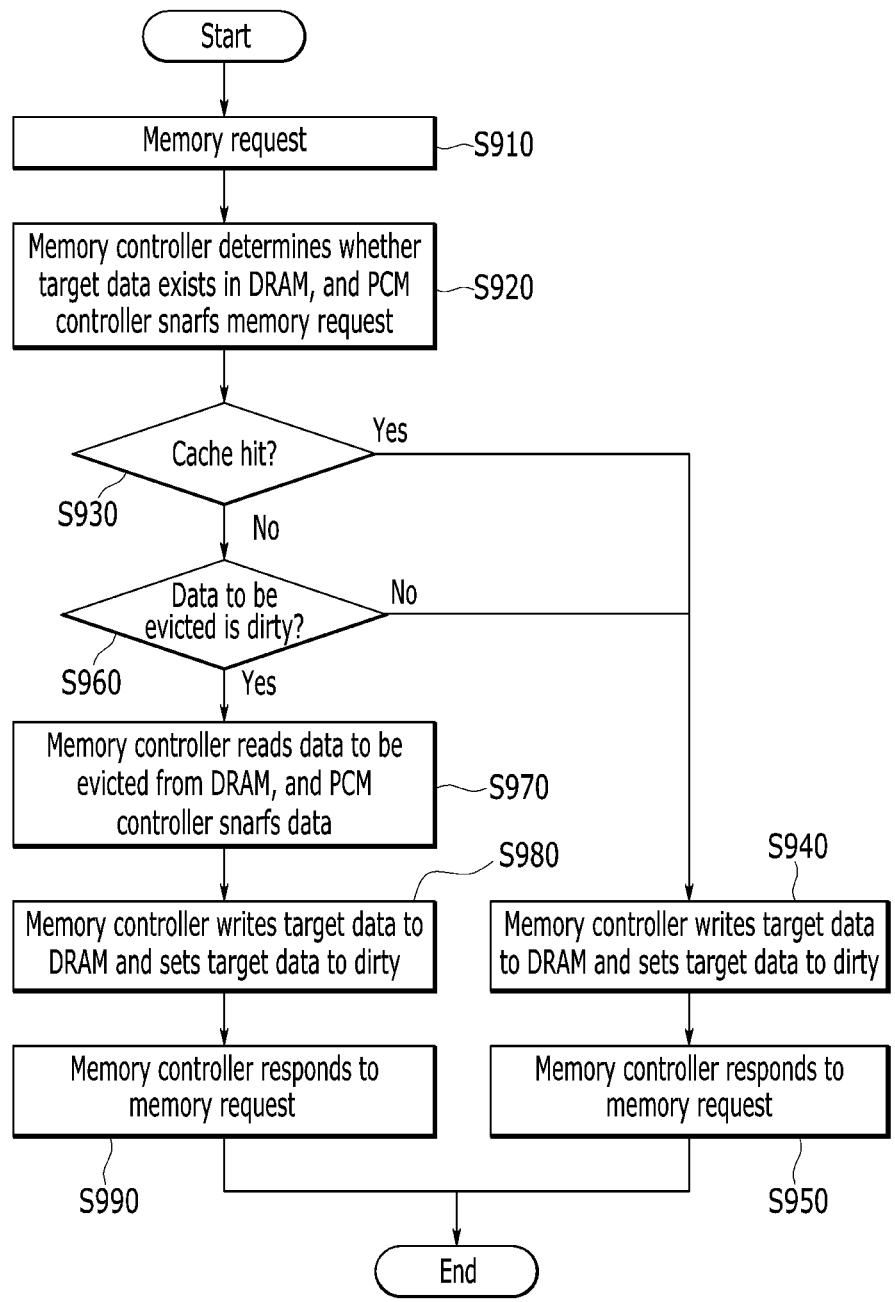
FIG. 9 is a flowchart showing an example of a write operation in a vertically-integrated mode of a hybrid memory system according to an embodiment.

FIG. 8 is a flowchart showing an example of a read operation in a vertically-integrated mode of a hybrid memory system according to an embodiment, and FIG. 9 is a flowchart showing an example of a write operation in a vertically-integrated mode of a hybrid memory system according to an embodiment.

Referring to FIG. 8, in a vertically-integrated mode, when an accelerator processor (e.g., 210 in FIG. 2) generates a memory request of a read request, a memory controller (e.g., 221 in FIG. 2) of a hybrid memory system may receive the memory request at S810. The memory controller 221, for example, a tag check module (e.g., 480 in FIG. 4) of the memory controller 221 may determine whether target data of the memory request exists in a DRAM (i.e., cache) (e.g., 480 in FIG. 222) used as an inclusive cache at S820. In some embodiments, a PCM controller (e.g., 223 of FIG. 2) may snarf the memory request at S820. In some embodiments, the PCM controller 223 may snarf the memory request (e.g., an address and a request type) which the tag check module 480 transfers to the DRAM 222 at S820.

When the target data exists in the DRAM 222 (i.e., when a cache hit of the memory request occurs in the DRAM 222) at S830, the memory controller 221 may read the target data from the DRAM 222 and respond to the memory request with the memory request (i.e., transmit a completion message together with the target data to the accelerator processor 210) at S840. In some embodiments, a DDR interface controller (e.g., 450 in FIG. 4) of the memory controller 221 may read the target data from the DRAM 222, and a scheduler (e.g., 440 in FIG. 4) may store the completion message and the target data in an output buffer (e.g., 430 in FIG. 4), and transmit the completion message and the target data through a router (e.g., 410 in FIG. 4) at S 840.

When the target data does not exist in the DRAM 222 (i.e., when a cache miss of the memory request occurs in the DRAM 222) at S830, the memory controller 221 may determine whether the data to be evicted from the DRAM 222 is in a dirty state at S850. That is, the memory controller 221 may determine whether a cache line corresponding to the data to be evicted from the DRAM 222 is in a state in which the cache line has been modified after being stored (for example, a state in which a dirty bit is set to '1') at S850. When the data to be evicted is in the dirty state at S850, the memory controller 221, for example, the DDR interface controller 450 may read the data to be evicted from the DRAM 222 through a memory channel (e.g., 225 in FIG. 2) at S860. At the same time, the PCM controller 223, for example, a channel monitor (e.g., 550 in FIG. 5) of the PCM controller 223 may monitor the memory channel 225, snarf the data (i.e., the data to be evicted) which the memory controller 221 reads from the DRAM 222, and store the snarfed data at S860. For example, the PCM controller 223 may store the snarfed data in a read buffer (e.g., 510 of FIG. 5) at S860.

Next, the PCM controller 223 may migrate the target data of the memory request from the PCM 224 to the DRAM 222 at S870. At the same time, the memory controller 221 may snarf the target data migrating from the PCM 224 to the DRAM 222 and respond to the memory request with the snarfed target data (i.e., transmit a completion message with the target data to the accelerator processor 210) at S870. Further, the PCM controller 223, for example, a PCM protocol engine (e.g., 540 in FIG. 5) of the PCM controller 223 may store the snarfed data (i.e., the data evicted from DRAM 222) in the PCM 224 at S870. In some embodiments, a DDR-T interface controller (e.g., 460 in FIG. 4) of the memory controller 221 may forwards the memory request to the PCM controller 223 via the memory channel 225. The PCM protocol engine 540 may read the target data from the PCM 224, a scheduler (e.g., 530 in FIG. 5) may store the target data in a write buffer (e.g., 520 in FIG. 5), and a DDR sequence generator (e.g., 570 in FIG. 5) may write the target data into the DRAM 222 through the memory channel 225 at S870. Furthermore, a channel monitor (e.g., 470 in FIG. 4) of the memory controller 221 may snarf the target data that the DDR sequence generator 540 writes to the DRAM 222 through the memory channel 225 to generate a completion message. The scheduler 440 may store the completion message and the target data in the output buffer 430 and transmit the completion message and the target data through the router 410 at S870.

When the data to be evicted is not in the dirty state at S850, the PCM controller 223 may migrate the target data of the memory request from the PCM 224 to the DRAM 222 at S880. At the same time, the memory controller 221 may snarf the target data migrating from the PCM 224 to the DRAM 222 and respond to the memory request with the snarfed target data (i.e., transmits a completion message along with the target data to the accelerator processor 210) at S880.

Referring to FIG. 9, in a vertically-integrated mode, when an accelerator processor 210 generates a memory request of a write request, a memory controller 221 of a hybrid memory system may receive the memory request at S910. The memory controller 221, for example, a tag check module 480 of the memory controller 221 may determine whether the target data of the memory request exists in a DRAM 222 used as an inclusive cache at S920. In some embodiments, a PCM controller 223 may snarf the memory request at S920. In some embodiments, the PCM controller 223 may snarf the memory request transmitted from the tag check module 480 to the DRAM 222 at S920.

When the target data does not exist in the DRAM 222 (i.e., when a cache miss of the memory request occurs in the DRAM 222) at S930, the memory controller 221 may determine whether data to be evicted from the DRAM 222 is in a dirty state at S960. When the target data exists in the DRAM 222 (i.e., when a cache hit of the memory request occurs in the DRAM 222) at S930, or when the data to be evicted from the DRAM 222 is not in the dirty state at S960, the memory controller 221 may write the target data to the DRAM 222 and set the target data to the dirty state at S940. For example, the memory controller 221 may set a dirty bit of the target data to '1' at S940. Further, the memory controller 221 may respond to the memory request by transmitting a completion message to the accelerator processor 210 at S950. In some embodiments, a DDR interface controller 450 of the memory controller 221 may write the target data to the DRAM 222. The scheduler 440 may store the completion message to an output buffer (e.g., 430 in FIG. 4) at S940, and may transmit the completion message through the router 410 at S950.

When the target data does not exist in the DRAM 222 at S930 and the data to be evicted is in the dirty state at S960, the memory controller 221, for example, the DDR interface controller 450 may read the data to be evicted from the DRAM through a memory channel 225 at S970. At the same time, the PCM controller 223, for example, a channel monitor 550 of the PCM controller 223 may monitor the memory channel 225, snarf the data (the evicted data) that the memory controller 221 reads from the DRAM 222, and write the snarfed data to the PCM 224 at S970.

Next, the memory controller 221, for example, the DDR interface controller 450 may write the target data to the DRAM 222 and set the target data to the dirty state at S980. For example, the memory controller 221 may set the dirty bit of the target data to '1' at S980. In some embodiments, the memory controller 221 may write the target data to the DRAM 222 without waiting for the PCM controller 223 completes writing the snarfed data to the PCM 224. Furthermore, the memory controller 221 may respond to the memory request by transmitting a completion message to the accelerator processor 210 at S990.

Next, an operation in a horizontal integration mode of a hybrid memory system according to an embodiment is described with reference to FIG. 10 to FIG. 12.

Figure 10:
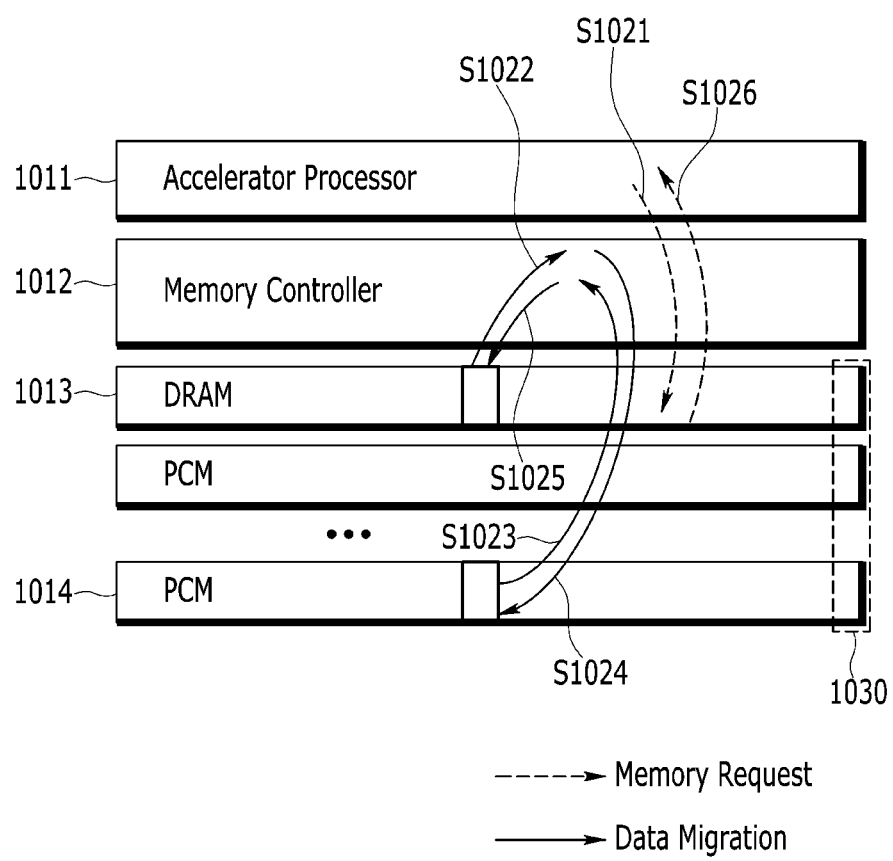
FIG. 10 is a diagram for explaining an example of a horizontal integration mode of a hybrid memory system that does not use dual routes.
Figure 11:
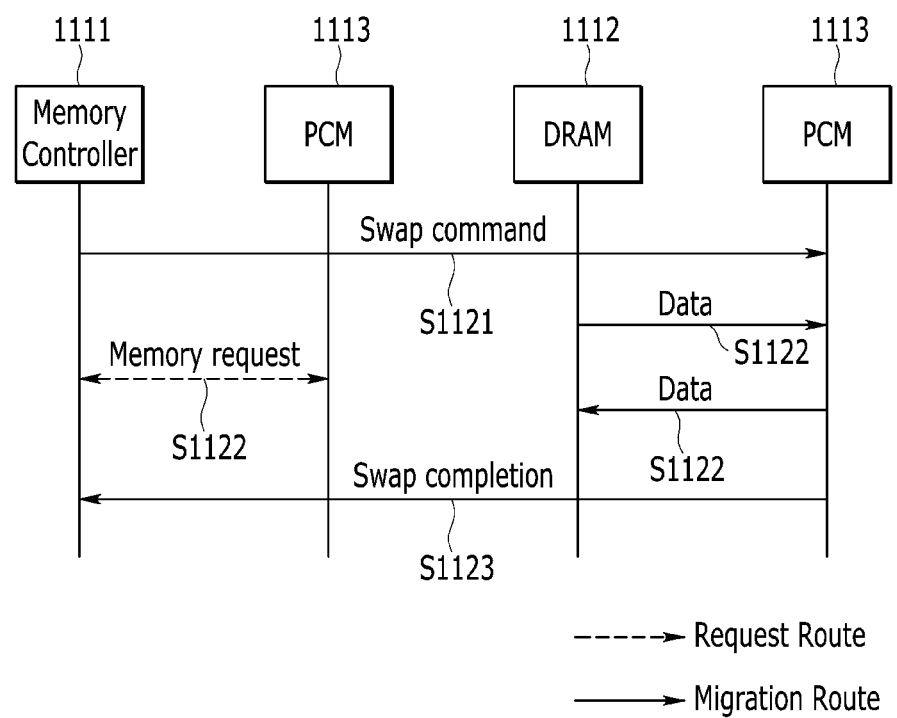
FIG. 11 is a diagram for explaining an example of a horizontal integration mode of a hybrid memory system according to an embodiment.

FIG. 10 is a diagram for explaining an example of a horizontal integration mode of a hybrid memory system that does not use dual routes, and FIG. 11 is a diagram for explaining an example of a horizontal integration mode of a hybrid memory system according to an embodiment. It is assumed in FIG. 10 and FIG. 11 that a memory request is a read request, and target data of the memory request exists in a PCM. In a horizontal integration mode, one DRAM page and a plurality of PCM pages may form a logical group 1030 in a hybrid memory system.

Referring to FIG. 10, when the memory request occurs in an accelerator processor 1011, the memory request may access a DRAM 1013 or a PCM 1014 at S1011. It is assumed in FIG. 10, that the memory request accesses the PCM 1014 at S1021.

When a page of the PCM 1014 is a frequently accessed page, a memory controller 1012 may reads a page of the DRAM 1013 belonging to the same logical group as the corresponding page of the PCM 1014 at S1022, and read the frequently-accessed page of the PCM 1014 at S1023. Next, the memory controller 1012 may write the data read from the page of the DRAM 1013 to an address of the PCM 1014 corresponding to the frequently-accessed page of the PCM 1014 at S1024, and write the data read from the page of the PCM 1014 to an address of the DRAM 1013 corresponding to the page of the DRAM 1013 at S1025. In this way, the memory controller may perform a swap operation to swap locations of the frequently-accessed page of the PCM 1014 and the page of the DRAM 1013 belonging to the same logical group as the page of the PCM 1014, thereby performing a prefetching operation.

After performing the prefetching operation at S1022 to S1025, the memory controller may respond to the memory request by reading data from the page of the PCM 1014 at S1026.

As such, when the dual routes are not used, since the memory controller performs both the memory request processing operation (S1010 and S1060) and the prefetching operation (S1020 to S1050), the memory request processing operation (S1010 and S1060) and the prefetching operation (S1020-S1050) may not be performed simultaneously.

Referring to FIG. 11, when a page of a PCM 1113 is frequently accessed, a memory controller 1111 may send a swap command to the PCM 1113 at S1121. The swap command may include an address of a page (i.e., data) of a DRAM 1112 and an address of a page (i.e., data) of the PCM 1113 to be swapped. In some embodiments, the memory controller 1111 may prevent a conflict by suspending processing of a memory request for a swap target address until a message indicating that a swap operation has been completed is received.

Next, a PCM controller may read the data of the DRAM 1112 to be swapped and the data of the PCM 1113 to be swapped (S1122). The PCM controller may write the data read from the DRAM 1112 to the PCM 1113 and write the data read from the PCM 1113 to the DRAM 1112 at S1122. While performing such a data migration operation, the memory controller 1111 may process the memory requests in parallel at S1122.

After the swap operation is completed, the PCM controller may transmit a message indicating completion of the swap operation to the memory controller 1111 at S1123. Upon receiving the corresponding message, the memory controller 1111 may process the memory request that is suspended to prevent the collision while the swap operation is in progress.

In this way, by performing data transfer in parallel through a request route and a migration route in the dual routes, the memory request operations can be processed simultaneously without being delayed by the prefetching operation.

Figure 12:
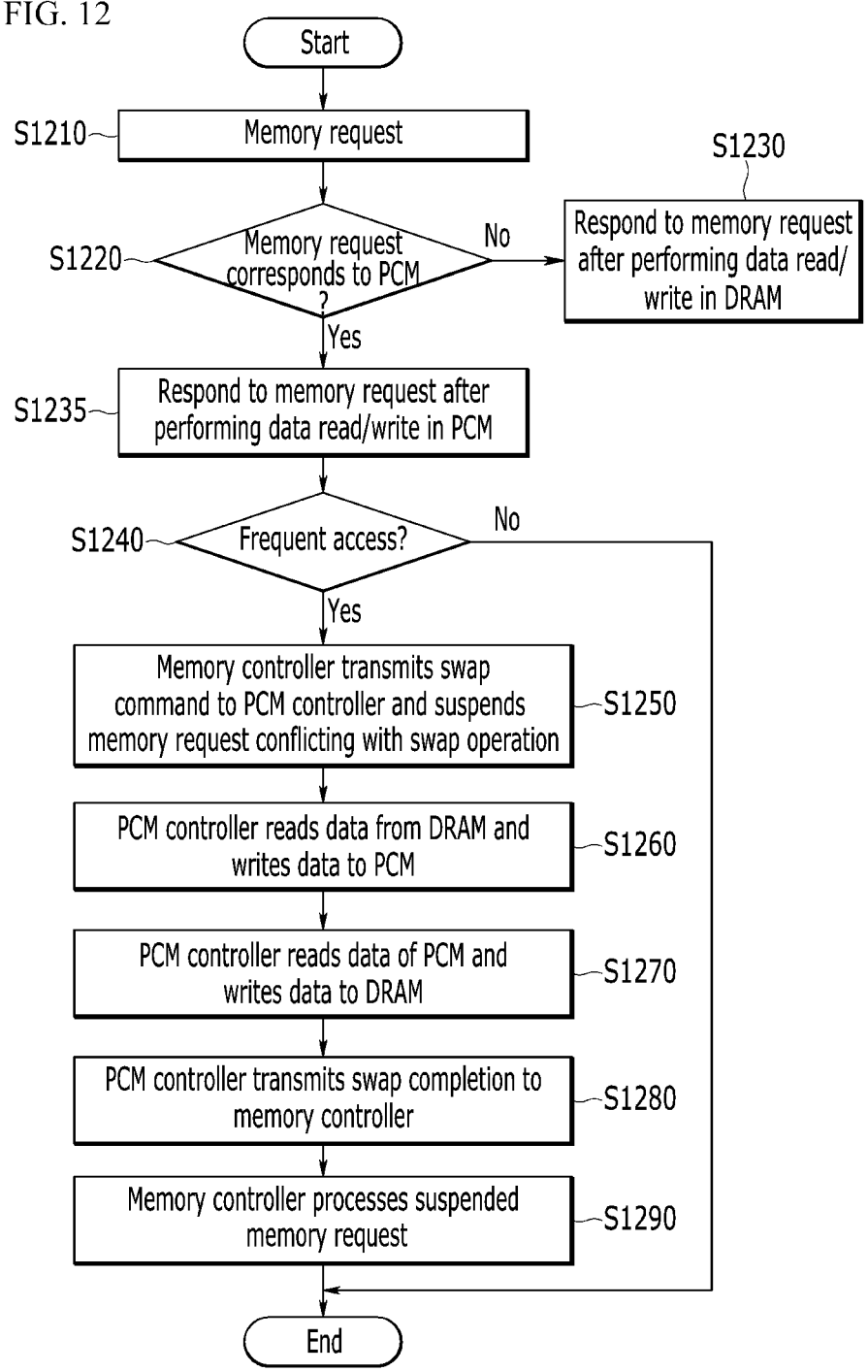
FIG. 12 is a flowchart showing an example of an operation of a horizontal integration mode in a hybrid memory system according to an embodiment.

FIG. 12 is a flowchart showing an example of an operation of a horizontal integration mode in a hybrid memory system according to an embodiment.

Referring to FIG. 12, in a horizontal integration mode, when an accelerator processor (e.g., 210 in FIG. 2) generates a memory request, a memory controller (e.g., 221 in FIG. 2)

of a hybrid memory system may receive the memory request at S1210. The memory controller 221, for example, a scheduler (e.g., 440 in FIG. 4) of the memory controller 221 may determine whether a physical address corresponding to a logical address of the memory request corresponds to a DRAM (e.g., 222 in FIG. 2) or a PCM (e.g., 224 in FIG. 2) at S1220. When the memory request corresponds to the DRAM 222, the memory controller 221 may read or write target data from or to the DRAM 222 according to the memory request, and respond to the memory request at S1230. In some embodiments, when the memory request is a read request, a DDR interface controller (e.g., 450 in FIG. 4) of the memory controller 221 may read target data from the DRAM 222 through a memory channel (e.g., 225 in FIG. 2) and generate a completion message. A scheduler (e.g., 440 in FIG. 2) may store the completion message and the target data in an output buffer (e.g., 430 in FIG. 4), and transmit the completion message and the target data through a router (e.g., 410 in FIG. 4) at S1230. In some embodiments, when the memory request is a write request, the DDR interface controller 450 may write target data to the DRAM 222 through the memory channel 225 and generate a completion message. The scheduler 440 may store the completion message in the output buffer 430 and transmit the completion message through the router 410 at S1230.

When the memory request corresponds to the PCM 224, the PCM controller 223 may read or write the target data from or to the PCM 224 according to the memory request, and respond to the memory request at S1235. In some embodiments, a DDR-T interface controller (e.g., 460 in FIG. 4) of the memory controller 221 may transmit the memory request to the PCM controller 223. In some embodiments, when the memory request is the read request, a PCM protocol engine (e.g., 540 in FIG. 5) of the PCM controller 223 may read the target data from the PCM 224, and a scheduler (e.g., 530 in FIG. 5) may store the completion message and the target data in a write buffer (e.g., 520 in FIG. 5) and transmit the completion message and the target data at S1235. In some embodiments, when the memory request is the write request, the PCM protocol engine 540 may write the target data to the PCM 224, and the scheduler 530 may stores the completion message in the write buffer 520, and transmit the completion message at S1235.

When the memory request corresponds to the PCM 224, the memory controller 221, for example, a scheduler (e.g., 440 in FIG. 4) of the memory controller 221 may determines whether the target data of the memory request satisfies a predetermined condition at S1240. In some embodiments, the predetermined condition may include a condition in which the target data belongs to a predetermined number of addresses (e.g., n addresses) which are most frequently accessed in recent memory requests occurring a predetermined number of times (e.g., k times). Here, n and k each are an integer greater than or equal to one). When the target data of the memory request satisfies the predetermined condition at S1240, the memory controller 221 may transmit a swap command to the PCM controller 223 at S1250. The swap command may include an address indicating the target data of the PCM 224 and an address indicating swap target data of the DRAM 222 to be swapped with the target data. In some embodiments, the memory controller 221 may suspend a memory request that conflicts with an operation according to the swap command from a time point at which the swap command is transmitted at S1250. In some embodiments, the scheduler 440 of the memory controller 221 may generate the swap command, and the DDR-T interface controller 460 may transmit the swap command to the PCM controller 223.

The PCM controller 223, for example, a DDR sequence generator (e.g., 570 in FIG. of the PCM controller 223 may read the swap target data from the DRAM 222 in response to the swap command, and the PCM memory controller 223, for example, the PCM protocol engine 540 may write the swap target data to the PCM 224 at S1260. Further, the PCM controller 223, for example, the sequence generator 570 may write the target data (i.e., the target data satisfying the predetermined condition) of the PCM 224 to the DRAM 222 at S1270. Next, the PCM controller 223, for example, the scheduler 530 of the PCM controller 223 may transmit a swap completion message to the memory controller 221 at S1280. In some embodiments, the memory controller 221, for example, the scheduler 440 may process the suspended memory request in response to the swap completion message at S1290.

Meanwhile, when the target data of the memory request does not satisfy the predetermined condition at S1240, the memory controller 221 and the PCM controller 223 may not perform the swap operation described above.

As described above, a hybrid memory system of an accelerator according to some embodiments can secure a higher memory capacity than conventional accelerators by using a PCM. Accordingly, when data-intensive applications such as artificial intelligence and bigdata processing are processed, much more data can be loaded into the accelerator so that a frequency of accessing and reading data from an external storage device can be reduced. As a result, it is possible to effectively solve problems of performance deterioration and power consumption increase due to data migration.

Next, a result of measuring performance by implementing an accelerator according to some embodiments in actual hardware is described. Aa a result of using a GPU as an accelerator, setting simulation conditions as in Table 1, and measuring performance with workloads shown in Table 2 by using an accelerator simulator (MacSim), it can be observed that the performance is improved by more than 72% compared to an accelerator using the existing DRAM-based memory system. Detailed simulation results may be seen from a paper published by the inventors (Jie Zhang and Myoungsoo Jung, "Ohm-GPU: Integrating New Optical Network and Heterogeneous Memory into GPU Multi-Processors," In MICRO '21: 54th Annual IEEE/ACM International Symposium on Microarchitecture (MICRO '21), Oct. 18-22, 2021, Virtual Event, Greece. ACM, New York, NY, USA, 14 page).

TABLE 1

| Name | Configurations |
| --- | --- |
| Number of SMs/frequency in GPU | 16/1.2 GHz |
| L1 cache of GPU | 48 KB, 6-way, private |
| L2 cache of GPU | 6 MB, 8-way, shared |
| Electrical channels | 6 channels, 32-bit, 15 GHz |
| DRAM capacity (horizontally-integrated mode) | 12 GB |
| DRAM capacity (vertically-integrated mode) | 6 GB |
| DRAM tRCD/tRP/tCL | 25 ns/10 ns/11 ns |
| PCM capacity (horizontally-integrated mode) | 96 GB |
| PCM capacity (vertically-integrated mode) | 384 GB |
| PCM read latency | 190 ns |
| PCM write latency | 763 ns |

TABLE 2

| Workload | Type | Characteristics | Description |
| --- | --- | --- | --- |
| Backp | Deep learning | Write-intensive, Compute-intensive | Back Propagation: Algorithm that learns weights by calculating a gradient of a loss function in deep learning |
| Lud | Scientific application | Write-intensive, Compute-intensive | LU Decomposition: Algorithm to decompose a matrix into two triangular matrices in linear algebra |
| GRAMS | Scientific application | Write-intensive, Data-intensive | Gram-Schmidt Decomposition: Algorithm to find an orthogonal basis from a given basis in linear algebra |
| FDTD | Scientific application | Write-intensive, Data/compute-intensive | Finite-Difference Time-Domain method Numerical algorithms used to model systems in electromagnetism |
| Betw | Graph analysis | Read-intensive, Data-intensive | Betweenness Centrality: (1) Algorithm that calculates the number of minimum paths on a graph that passes through a specific node, (2) Used for network characteristics analysis |
| Bfsdata | Graph analysis | Read-intensive, Data-intensive | Breadth-First Search (data-driven): Search algorithm that visits nodes in a graph in order of proximity from a reference node |
| Bfstopo | Graph analysis | Read-intensive, Compute-intensive | Breadth-First Search (topological-driven): (1) Search algorithm that visits nodes in a graph in order of proximity from a reference, (2) One warp handles edges connected to one node |
| Gctopo | Graph analysis | Read-intensive, Data/compute-intensive | Graph Coloring (topological-driven): (1) Algorithm that colors all nodes in a way that neighboring nodes do not have the same color, (2) One warp handles edges connected to one node |
| Pagerank | Graph analysis | Read-intensive, Data-intensive | Pagerank: (1) Algorithm that calculates importance of nodes in a graph, (2) Mainly used in search engines to list contents in order that a user will be satisfied with. |
| Sssp | Graph analysis | Read-intensive Data/compute-intensive | Single-Source Shortest Path: Algorithm to find the shortest path from a specific single node to all other nodes |

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An accelerator comprising:
a processor; and
a hybrid memory system connected to the processor and comprising:
a resistance-based non-volatile memory;
a dynamic random-access memory (DRAM) used as a cache of the resistance-based non-volatile memory;
a non-volatile memory controller connected to the resistance-based non-volatile memory and configured to control the DRAM and the resistance-based non-volatile memory;
a memory controller configured to process a memory request from the processor and control the DRAM; and
a memory channel configured to connect the DRAM, the non-volatile memory controller, and the memory controller.

2. The accelerator of claim 1, wherein the non-volatile memory controller is further configured to manage first data transfer in a migration route for data migration between the DRAM and the resistance-based non-volatile memory, and wherein the memory controller is further configured to manage second data transfer in a request route for processing the memory request.

3. The accelerator of claim 2, wherein the memory controller and the non-volatile memory controller are further configured to perform the first data transfer in the migration route and the second data transfer in the request route in parallel.

4. The accelerator of claim 1, wherein the non-volatile memory controller comprises:
a non-volatile memory protocol engine configured to access the resistance-based non-volatile memory based on a protocol that the resistance-based non-volatile memory complies with; and
a sequence generator configured to access the DRAM based on a protocol that the DRAM complies with.

5. The accelerator of claim 4, wherein the memory controller comprises a channel monitor configured to monitor a state of the memory channel and snarf data that the non-volatile memory controller writes to the DRAM.

6. The accelerator of claim 1, wherein the non-volatile memory controller comprises a channel monitor configured to monitor a state of the memory channel and snarf data that the memory controller reads from the DRAM.

7. The accelerator of claim 1, wherein the DRAM is configured to be used as an inclusive cache of the resistance-based non-volatile memory.

8. The accelerator of claim 1, wherein the DRAM is configured to be used as a prefetching cache of the resistance-based non-volatile memory.

9. The accelerator of claim 1, wherein the hybrid memory system is configured to be set to a mode among a plurality of modes based on a user's selection, the plurality of modes comprising a first mode in which the DRAM is used as an inclusive cache of the resistance-based non-volatile memory and a second mode in which the DRAM is used as a prefetching cache of the resistance-based non-volatile memory.

10. A hybrid memory system mounted on an accelerator, the hybrid memory system comprising:
   a resistance-based non-volatile memory;
   a DRAM used as an inclusive cache of the resistance-based non-volatile memory;
   a memory controller configured to manage data migration for processing a memory request from a processor of the accelerator;
   a non-volatile memory controller configured to manage data migration between the resistance-based non-volatile memory and the DRAM; and
   a memory channel configured to connect the DRAM, the non-volatile memory controller, and the memory controller.

11. The hybrid memory system of claim 10, wherein the memory controller is further configured to determine whether a cache miss of the memory request indicating read occurs in the DRAM, and determine whether first data to be evicted from the DRAM based on the cache miss is in a dirty state when the cache miss occurs, and
   wherein when the first data is not in the dirty state, the non-volatile memory controller is further configured to write second data of the resistance-based non-volatile memory to the DRAM, and the memory controller is further configured to respond to the memory request by snarfing the second data that the non-volatile memory controller writes to the DRAM.

12. The hybrid memory system of claim 10, wherein the memory controller is further configured to determine whether a cache miss of the memory request indicating read occurs in the DRAM, and determine whether first data to be evicted from the DRAM based on the cache miss is in a dirty state when the cache miss occurs, and
   wherein when the first data is in the dirty state:
   the memory controller is further configured to read and evict the first data from the DRAM;
   the non-volatile memory controller is further configured to snarf the first data evicted from the DRAM, and write second data stored in the resistance-based non-volatile memory to the DRAM;
   the memory controller is further configured to respond to the memory request by snarfing the second data that the non-volatile memory controller writes to the DRAM; and
   the non-volatile memory controller is further configured to write the first data to the resistance-based non-volatile memory.

13. The hybrid memory system of claim 10, wherein the memory controller is further configured to determine whether a cache miss of the memory request indicating write occurs in the DRAM, and determine whether first data to be evicted from the DRAM based on the cache miss is in a dirty state when the cache miss occurs, and
   wherein when the first data is not in the dirty state, the memory controller is further configured to respond to the memory request by writing second data of the memory request to the DRAM and setting the second data to a dirty state.

14. The hybrid memory system of claim 10, wherein the memory controller is further configured to determine whether a cache miss of the memory request indicating write occurs in the DRAM, and determine whether first data to be evicted from the DRAM based on the cache miss is in a dirty state when the cache miss occurs, and
   wherein when the first data is in the dirty state:
   the memory controller is further configured to read and evict the first data from the DRAM;
   the non-volatile memory controller is further configured to snarf the first data evicted from the DRAM and write the first data to the resistance-based non-volatile memory; and
   the memory controller is further configured to respond to the memory request by writing second data of the memory request to the DRAM and setting the second data to a dirty state.

15. A hybrid memory system mounted on an accelerator, the hybrid memory system comprising:
   a resistance-based non-volatile memory;
   a DRAM used as a prefetching cache of the resistance-based non-volatile memory;
   a memory controller configured to manage data migration for processing a memory request from a processor of the accelerator;
   a non-volatile memory controller configured to manage data migration between the resistance-based non-volatile memory and the DRAM; and
   a memory channel configured to connect the DRAM, the non-volatile memory controller, and the memory controller.

16. The hybrid memory system of claim 15, wherein when the memory request corresponds to the resistance-based non-volatile memory, the memory controller is further configured to perform read or write in the resistance-based non-volatile memory in response to the memory request.

17. The hybrid memory system of claim 16, wherein when the first data of the memory request satisfies a predetermined condition, the memory controller and the non-volatile memory controller are further configured to swap first data of the resistance-based non-volatile memory and second data of the DRAM.

18. The hybrid memory system of claim 17, wherein the predetermined condition comprises a condition in which the memory request belongs to a first predetermined number of addresses that are most frequently accessed in recent memory requests occurring a second predetermined number of times.

19. The hybrid memory system of claim 17, wherein the memory controller is further configured to transmit a swap command to the non-volatile memory controller, and
   wherein the non-volatile memory controller is further configured to transmit swap completion to the memory controller after reading the second data from the DRAM, writing the second data to the resistance-based non-volatile memory, reading the first data from the resistance-based non-volatile memory, and writing the first data to the DRAM.

20. The hybrid memory system of claim 19, wherein the memory controller is configured to suspend a memory request conflicting with an operation according to the swap command at a time of transmitting the swap command, and process the suspended memory request in response to the swap completion.

* * * * *